United States Patent
Okunishi (10) Patent No.: US 12,400,459 B2
(45) Date of Patent: Aug. 26, 2025

(54) DIRT DETECTION SYSTEM FOR VEHICLE-MOUNTED CAMERA AND VEHICLE PROVIDED WITH THE DIRT DETECTION SYSTEM

(71) Applicant: HONDA MOTOR CO., LTD., Tokyo (JP)

(72) Inventor: Shinichi Okunishi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 16 days.

(21) Appl. No.: 18/421,151

(22) Filed: Jan. 24, 2024

(65) Prior Publication Data
US 2024/0331406 A1   Oct. 3, 2024

(30) Foreign Application Priority Data

Mar. 28, 2023 (CN) .......................... 202310315331.3

(51) Int. Cl.
*G06V 20/58* (2022.01)
*G06T 7/00* (2017.01)
*G06V 10/60* (2022.01)

(52) U.S. Cl.
CPC .......... *G06V 20/586* (2022.01); *G06T 7/0002* (2013.01); *G06V 10/60* (2022.01); *G06V 20/584* (2022.01)

(58) Field of Classification Search
None
See application file for complete search history.

(56) References Cited

U.S. PATENT DOCUMENTS

| | | | | |
|---|---|---|---|---|
| 10,089,540 | B2* | 10/2018 | May | H04N 7/18 |
| 2022/0327666 | A1* | 10/2022 | Ollila | H04N 25/61 |
| 2023/0106754 | A1* | 4/2023 | Shimizu | B60K 35/00 |
| | | | | 701/36 |
| 2023/0316482 | A1* | 10/2023 | Tsurube | B60R 1/20 |
| | | | | 348/148 |
| 2024/0267636 | A1* | 8/2024 | Furman | H04N 23/635 |
| 2024/0331406 | A1* | 10/2024 | Okunishi | G06T 7/0002 |

FOREIGN PATENT DOCUMENTS

| | | | | |
|---|---|---|---|---|
| CN | 211179500 | U * | 8/2020 | |
| CN | 111726612 | A * | 9/2020 | |
| CN | 113399377 | A * | 9/2021 | B08B 13/00 |

(Continued)

OTHER PUBLICATIONS

Translation of CN 111726612 (Year: 2020).*

*Primary Examiner* — Ricky Chin
(74) *Attorney, Agent, or Firm* — Armstrong Teasdale LLP (57) ABSTRACT

In a dirt detection system for detecting dirt adhering to a lens of a camera provided on an outer surface of a vehicle body of a vehicle to capture an image of surroundings of the vehicle body, the dirt detection system includes a controller configured to perform image processing to acquire desired information from the captured image obtained by the camera, and the controller is configured to detect, from the captured image, a reference light source that serves as a reference in detecting the dirt adhering to the lens of the camera, and to detect the dirt adhering to the lens of the camera based on an image state around the reference light source that appears in the captured image.

8 Claims, 7 Drawing Sheets

(56) References Cited

FOREIGN PATENT DOCUMENTS

| | | | |
|---|---|---|---|
| CN | 115546117 A | * | 12/2022 |
| JP | 2016222181 A | | 12/2016 |
| JP | 2018017601 A | * | 2/2018 |
| JP | 2018197666 A | * | 12/2018 |
| JP | 2019176300 A | * | 10/2019 |
| JP | 2021156824 A | * | 10/2021 |
| JP | 2022022495 A | * | 2/2022 |
| WO | WO-2019049381 A1 | * | 3/2019 ................ B60S 1/04 |

* cited by examiner

DIRT DETECTION SYSTEM FOR VEHICLE-MOUNTED CAMERA AND VEHICLE PROVIDED WITH THE DIRT DETECTION SYSTEM

TECHNICAL FIELD

The present invention relates to a dirt detection system for a vehicle-mounted camera for detecting dirt adhering to the lens of a camera provided on an outer surface of a vehicle body to capture an image of the surroundings of the vehicle body.

BACKGROUND ART

In recent years, efforts have been made to provide access to sustainable transportation systems that take into account in vulnerable situations among traffic participants. To achieve this, research and development are focused on further improving the safety and convenience of traffic through research and development related to preventive safety technology.

Vehicles may be provided with various cameras for purposes such as external environment recognition for driving assistance. In a case where a camera is provided on the vehicle body outer surface, there is a problem that dirt may adhere to the lens of the camera. JP2016-222181A discloses a technology for detecting such dirt on the lens of the camera. In this technology, laser light is irradiated from a laser light source to the lens of the camera as a marker, and dirt adhering to the lens of the camera is detected based on a captured image captured by the camera to include the marker.

In a case where dirt adheres to the lens of the camera so as to completely shield the whole or a part of the lens, the dirt on the lens of the camera can be easily detected, but in a case where dirt adheres to the lens of the camera uniformly and thinly, it is difficult to detect the dirt on the lens of the camera. The conventional technology may be able to solve such a problem, but in this technology, a dedicated light source (laser light source) is necessary as a light source serving as a reference in detecting the dirt on the lens of the camera, and therefore, there is a problem that the system configuration is complicated.

SUMMARY OF THE INVENTION

In view of such background, a primary object of the present invention is to provide a dirt detection system for a vehicle-mounted camera such that even in a state in which a thin dirt adheres uniformly to the lens of the camera, the dirt on the lens of the camera can be properly detected, and a dedicated light source serving as a reference in detecting the dirt on the lens of the camera is unnecessary. Also, the present invention aims to improve the vehicle control stability by properly detecting the dirt on the lens of the camera, thereby further improving the traffic safety and contributing to the development of a sustainable transportation system.

To achieve the above object, one aspect of the present invention provides a dirt detection system for detecting dirt adhering to a lens of a camera (7A) provided on an outer surface of a vehicle body (2) of a vehicle (1) to capture an image (15) of surroundings of the vehicle body, wherein the dirt detection system comprises a controller (26) configured to perform image processing to acquire desired information from the captured image obtained by the camera, and the controller is configured to detect, from the captured image, a reference light source (LR) that serves as a reference in detecting the dirt adhering to the lens of the camera, and to detect the dirt adhering to the lens of the camera based on an image state around the reference light source that appears in the captured image.

According to this aspect, even in a state in which thin dirt adheres uniformly to the lens of the camera, the dirt adhering to the lens of the camera can be properly detected. Also, since the reference light source serving as a reference in the dirt detection is detected from the captured image obtained by the camera, a dedicated light source serving as the reference light source is unnecessary.

Preferably, the controller is configured to detect the dirt adhering to the lens of the camera based on, as the image state around the reference light source that appears in the captured image, a state in which a luminance changes from the reference light source to a part around the reference light source in the captured image.

According to this aspect, the dirt adhering to the lens of the camera can be detected accurately. In this case, it is possible to detect the dirt adhering to the lens of the camera based on the gradient of the luminance change, for example. Note that the processing may be performed based on a pixel value other than the luminance, such as a brightness, for example.

Preferably, upon finding a light source satisfying a condition as the reference light source from the captured image, the controller sets the light source as the reference light source, and stores positions of places where the reference light source is usable as learned light source information, and when detecting the dirt adhering to the lens of the camera, the controller detects the reference light source corresponding to a current position of the vehicle from the captured image based on the learned light source information and position information of the vehicle.

According to this aspect, by using an appropriate reference light source corresponding to the current position of the vehicle, the dirt detection can be performed properly and efficiently.

Preferably, the learned light source information includes position information of the reference light source present around a parking space regularly used by the vehicle.

According to this aspect, the dirt detection can be performed properly by using the same reference light source. Note that the dirt detection may be performed immediately before departing from the parking space regularly used by the vehicle.

Preferably, the controller is configured to detect, as the reference light source, a direction indicator light provided on the vehicle that appears in the captured image.

According to this aspect, the dirt detection can be performed by using an appropriate reference light source. In this case, if a camera is installed on a side surface of the vehicle body, for example, by capturing an image of an area including a direction indicator light provided on the side mirror (door mirror) with the camera, it is possible to acquire a captured image in which the direction indicator light appears.

Preferably, the controller is configured to turn on the direction indicator light before the vehicle starts, and to detect the direction indicator light that appears in the captured image as the reference light source.

According to this aspect, the dirt detection based on the reference light source can be performed properly. Note that "before the vehicle starts" may be a time immediately after the driving assistance function is activated, for example.

Alternatively, the controller may be configured to detect a traffic light that appears in the captured image as the reference light source.

According to this aspect, the dirt detection can be performed by using an appropriate reference light source. Note that other than the traffic light, the reference light source may be a street light.

Preferably, the controller is configured to detect the traffic light that appears in the captured image as the reference light source after the vehicle has started.

According to this aspect, the dirt detection based on the reference light source can be performed properly. Note that "after the vehicle has started" may be a time when the control by the driving assistance function is being performed, for example.

According to the foregoing configuration, even in a state in which thin dirt adheres uniformly to the lens of the camera, the dirt adhering to the lens of the camera can be detected properly. Also, since the reference light source serving as a reference in the dirt detection is detected from the captured image obtained by the camera, a dedicated light source serving as the reference light source is unnecessary.

DETAILED DESCRIPTION OF THE INVENTION

In the following, an embodiment of a dirt detection system for a vehicle-mounted camera according to the present invention will be described with reference to the drawings.

Figure 1:
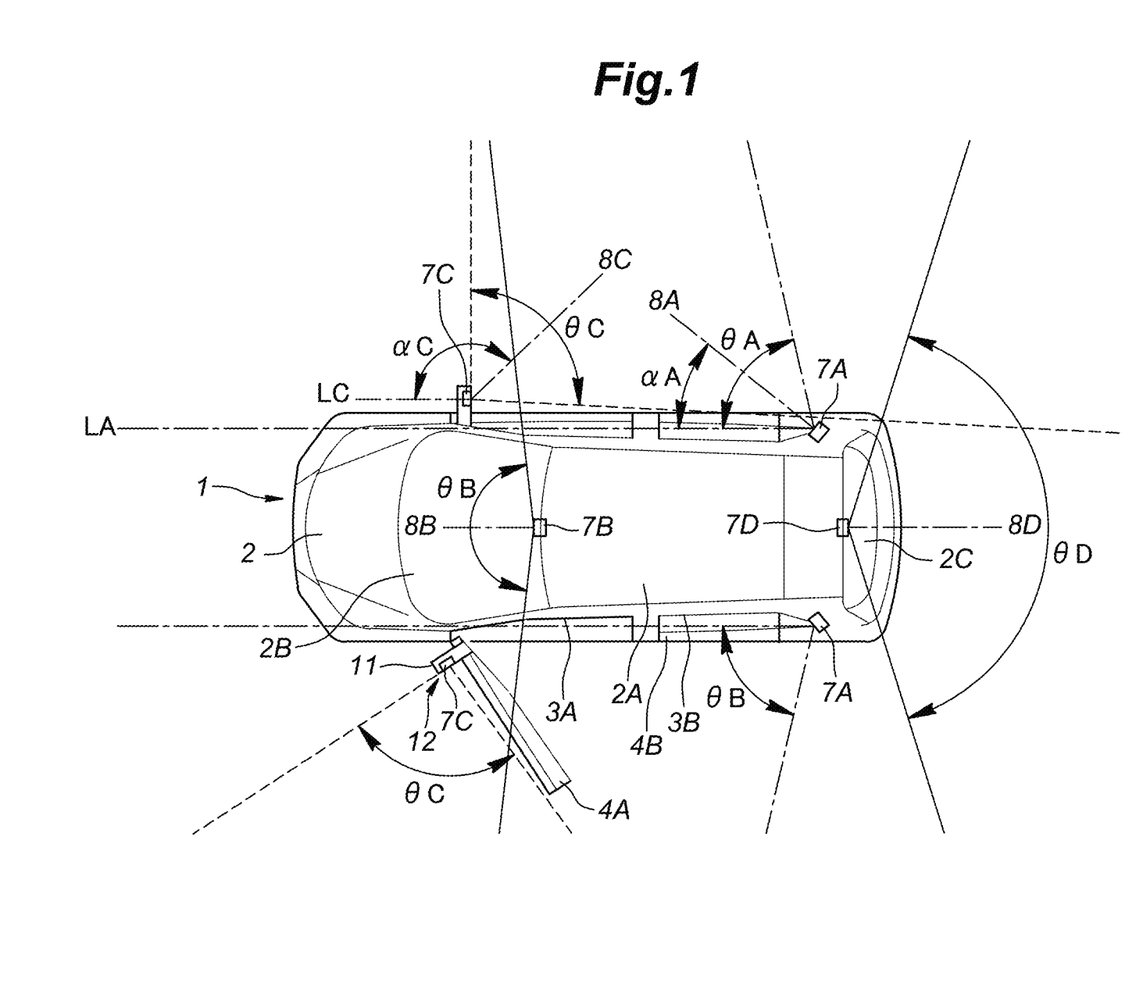
FIG. 1 is an explanatory diagram of a vehicle regarding an embodiment.
Figure 2:
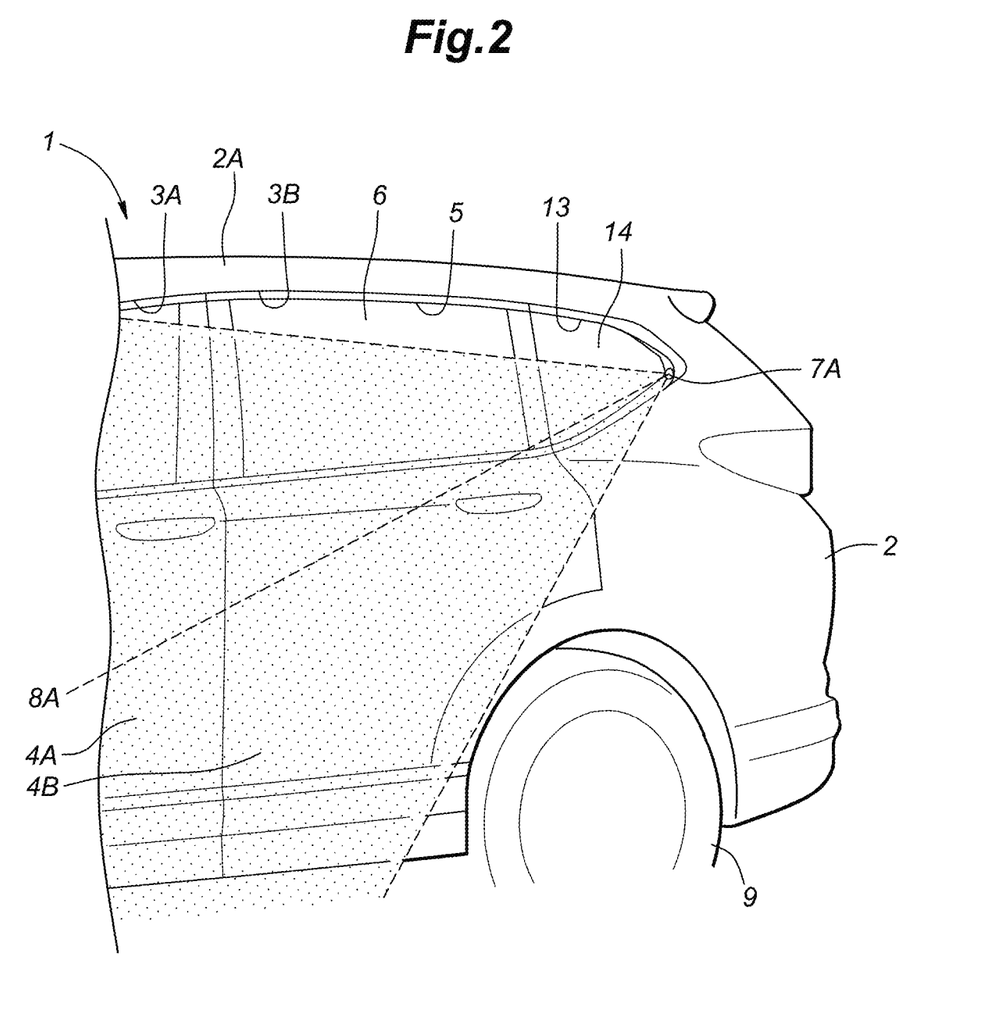
FIG. 2 is a perspective view showing a side portion of a vehicle body.

As shown in FIGS. 1 and 2, a vehicle 1 is a four-wheeled automobile. The vehicle 1 may be of a known type, such as a sedan type, an SUV type, a wagon type, a one-box type, etc. As one example, the vehicle 1 according to the present embodiment is a vehicle of an SUV type. In each of left and right side portions of a vehicle body 2 of the vehicle 1, at least one entrance/exit opening is provided. The at least one entrance/exit opening includes a front entrance/exit opening 3A and a rear entrance/exit opening 3B. Each entrance/exit opening 3A, 3B is provided with a door 4A, 4B. A door window 5 is provided in an upper portion of each door 4A, 4B. A window panel 6 is provided in the door window 5.

As shown in FIG. 1, the vehicle body 2 is provided with multiple cameras 7A to 7D. Each of the multiple cameras 7A to 7D may be a known CMOS image sensor or CCD. In the present embodiment, the cameras 7A to 7D include first to fourth cameras 7A to 7D. Two left and right first cameras 7A are provided on the outer surfaces of the left and right side portions of the vehicle body 2 in positions rearward of the entrance/exit openings 3. Specifically, the first cameras 7A are provided on the side portions of the vehicle body 2 in positions rearward of the rear entrance/exit openings 3B. Preferably, each first camera 7A is disposed above the rear wheel 9 of the vehicle 1 on the corresponding side. More specifically, each first camera 7A is preferably disposed rearward of the front end of the rear wheel 9 and forward of the rear end of the rear wheel 9. Also, each first camera 7A may be disposed rearward of the center of the rear wheel 9. The first cameras 7A are preferably disposed lower than the roof 2A of the vehicle body 2. The first cameras 7A are preferably provided on the outer surfaces of the side portions of the vehicle body 2.

Optical axes 8A of the first cameras 7A are directed forward and laterally outward of the vehicle body 2. The horizontal angle of view θA of each first camera 7A preferably is 70 to 130 degrees, for example. The optical axis 8A of each first camera 7A preferably has an angle αA of 35 to 65 degrees relative to a forward extending reference line LA, as seen from above. The left one of the first cameras 7A captures an image covering an area to the left of the left side portion of the vehicle body 2 and an area in the front left direction of the vehicle body 2, and the right one of the first cameras 7A captures an image covering an area to the right of the right side portion of the vehicle body 2 and an area in the front right direction of the vehicle body 2.

As seen in a lateral direction, an angle defined between the optical axis 8A of each first camera 7A and a horizontal surface preferably is 30 degrees or less in the upward or downward direction.

The second camera 7B is provided on an inboard side of an upper portion of the front window 2B to capture an image of an area in front of the vehicle body 2. An optical axis 8B of the second camera 7B extends in the forward direction of the vehicle body 2. The horizontal angle of view θB of the second camera 7B preferably is 90 to 180 degrees, for example.

The left and right third cameras 7C are provided on the front portions of the left and right front doors 4A, respectively, and capture images of areas in the rear left and rear right directions of the vehicle body 2. The imaging range of the third cameras 7C changes according to opening and closing of the front doors 4A. In the following, the direction of the third cameras 7C is described assuming that the front doors 4A are in the closed position. The horizontal angle of view θC of each third camera 7C preferably is 70 to 130 degrees, for example. The optical axis 8C of each third camera 7C preferably has an angle αC of 115 to 145 degrees relative to a forward extending reference line LC, as seen from above. A front portion of each front door 4A may be provided with a columnar support part 11 that protrudes laterally outward. The third cameras 7C may be provided on the corresponding support parts 11. The support part 11 and the third camera 7C on each side configure a side mirror 12. In another embodiment, the side mirror 12 may be provided with an optical mirror.

As seen from above, the field of view of the second camera 7B preferably overlaps with the field of view of each third camera 7C. Also, as seen from above, the field of view of each first camera 7A preferably overlaps with the field of view of the laterally corresponding third camera 7C.

The fourth camera 7D is provided on a rear portion of the vehicle body 2 to capture an image of an area to the rear of the vehicle body 2. The optical axis 8D of the fourth camera 7D extends in the rearward direction of the vehicle body 2. The horizontal angle of view θD of the fourth camera 7D preferably is 130 to 180 degrees, for example. The fourth camera 7D may be provided at the rear end of the vehicle body 2 or may be provided on an inboard side of the rear window 2C. As seen from above, the field of view of the fourth camera 7D may overlap with the field of view of each first camera 7A.

Each first camera 7A is preferably disposed above the lower end of the corresponding door window 5. Also, each first camera 7A is preferably disposed above the upper end of the side mirror 12 on the corresponding side. In the present embodiment, each first camera 7A is disposed above the upper end of the side mirror 12 on the corresponding side. Specifically, each first camera 7A is preferably disposed above the upper end of the support part 11 on the corresponding side.

As shown in FIG. 2, an extension window 13 is provided in a part of each side portion of the vehicle body 2 rearward of the entrance/exit opening 3. In the present embodiment, the extension window 13 is provided in a part of each side portion of the vehicle body 2 rearward of the rear entrance/exit opening 3B. The front edge of the extension window 13 is connected to the rear edge of the rear entrance/exit opening 3B. In another embodiment, the rear entrance/exit opening 3B and the extension window 13 may be disposed to be spaced from each other in the front-rear direction. A pillar may be disposed between the rear entrance/exit opening 3B and the extension window 13. A window panel 14 is provided in the extension window 13. The window panel 14 is preferably fixed to an edge part of the extension window 13.

In this way, in the present embodiment, each first camera 7A can capture an image of an area near the side portion of the vehicle 1 regardless of the open/closed state of the doors 4A and 4B. Thus, the first cameras 7A can capture images of passengers getting in/out of the vehicle 1 through the front entrance/exit openings 3A and the rear entrance/exit openings 3B. Also, in cooperation of the first cameras 7A with the second camera 7B, the third cameras 7C, and the fourth camera 7D, images covering the entire area around the vehicle 1 can be acquired.

Note that in the following, description will be made of a system for detecting dirt adhering to the lens of the first camera 7A (rear side camera), but the target of the camera dirt detection is not limited to the first camera 7A. Namely, any camera provided on the vehicle body outer surface to capture an image of the surroundings of the vehicle body can be a target of the camera dirt detection. For example, any of the second camera 7B (front camera), the third cameras 7C (door cameras), and the fourth camera 7D (rear camera) may be the target of the camera dirt detection.

Figure 3A:
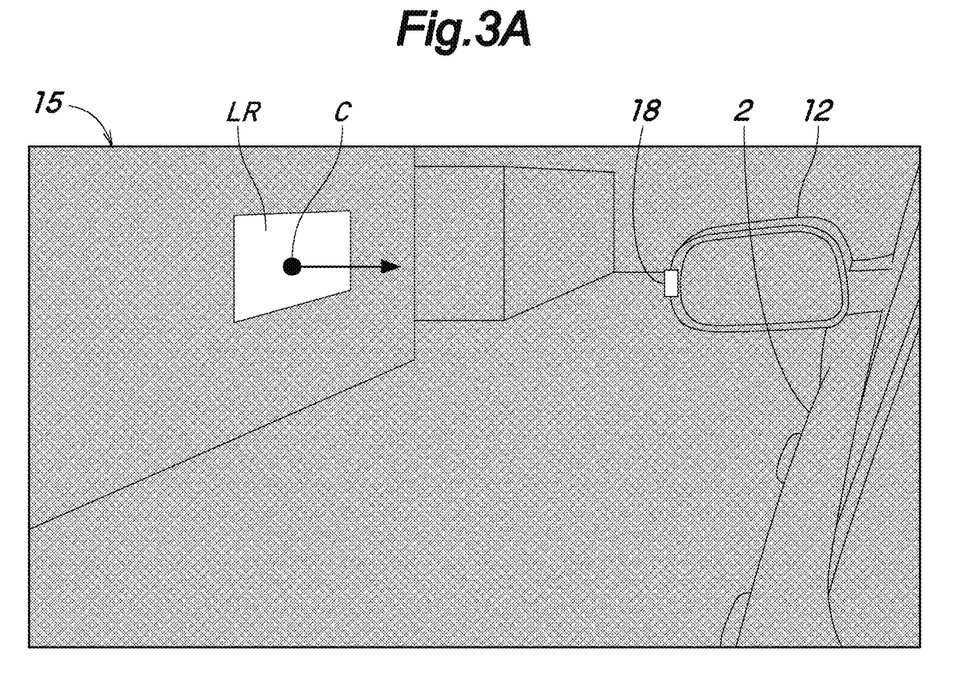
FIGS. 3A and 3B are explanatory diagrams of a captured image obtained by a first camera.
Figure 3B:
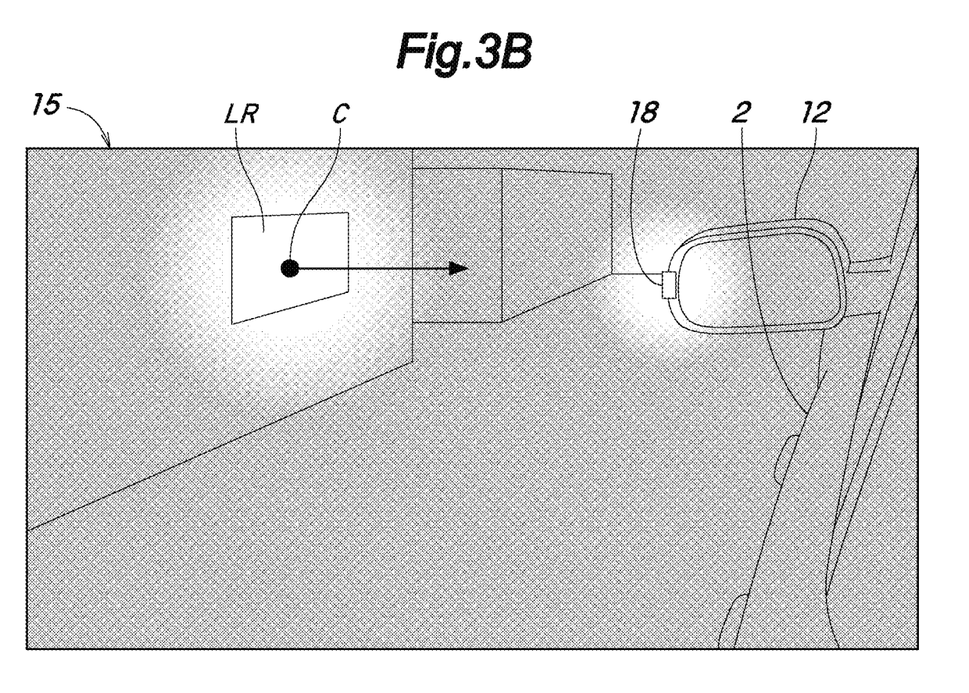

As shown in FIGS. 3A and 3B, in a captured image 15 obtained by the first camera 7A (rear side camera), the side surface of the vehicle body 2 of the vehicle 1 and the side mirror 12 of the vehicle 1 are included.

The example shown in FIGS. 3A and 3B is a captured image obtained by the first camera 7A when the vehicle 1 is parked in a regularly used parking space, such as a parking space provided at home, for example. In this case, light sources present around the parking space, such as building windows and street lights, for example, appear in the captured image. In the present embodiment, such a light source present around the parking space is set as a reference light source LR serving as a reference in the camera dirt detection.

Here, as shown in FIG. 3A, in a normal time, namely, when no dirt adheres to the lens of the first camera 7A, no blur occurs around the reference light source LR appearing in the captured image obtained by the first camera 7A. On the other hand, as shown in FIG. 3B, when a thin dirt adheres uniformly to the lens of the first camera 7A, a blur occurs around the reference light source LR appearing in the captured image obtained by the first camera 7A.

Thus, in the present embodiment, the dirt on the lens of the first camera 7A is detected based on a blur state of the reference light source LR appearing in the captured image obtained by the first camera 7A.

Note that some light sources may appear blurred in the captured image obtained by the first camera 7A even when no dirt adheres to the lens of the first camera 7A. Therefore, from among the light sources present in the surroundings, a light source that appears clearly in the captured image obtained by the first camera 7A when no dirt adheres to the lens of the first camera 7A is selected as the reference light source.

Incidentally, as shown in FIGS. 3A and 3B, in the captured image obtained by the first camera 7A (rear side camera), not only the side mirror 12 of the vehicle 1 but also a direction indicator light 18 provided on the side mirror 12 appears. Thus, in the present embodiment, the direction indicator light 18 of the vehicle 1 appearing in the captured image obtained by the first camera 7A is adopted as the reference light source, and the dirt on the lens of the first camera 7A is detected based on the blur state of the direction indicator light 18 in the captured image.

Note that the vehicle 1 is provided with various lighting devices (not shown in the drawings) in addition to the direction indicator light 18, and these lighting devices may be adopted as the reference light source. When required conditions are met depending on the angle of view of the camera (the first to fourth cameras 7A to 7D, etc.) to be a target of the camera dirt detection, the blind spots depending on the shape of the vehicle 1, etc., some of the various lighting devices provided on the vehicle 1 may appear in the image captured by the camera to be a target of the camera dirt detection.

Also, the image captured by the first camera 7A during travel of the vehicle 1 may include a traffic light present around the vehicle 1. Thus, in the present embodiment, the traffic light appearing in the captured image 15 obtained by the first camera 7A is adopted as the reference light source, and the dirt on the lens of the first camera 7A is detected based on the blur state of the traffic light in the captured image.

Figure 4:
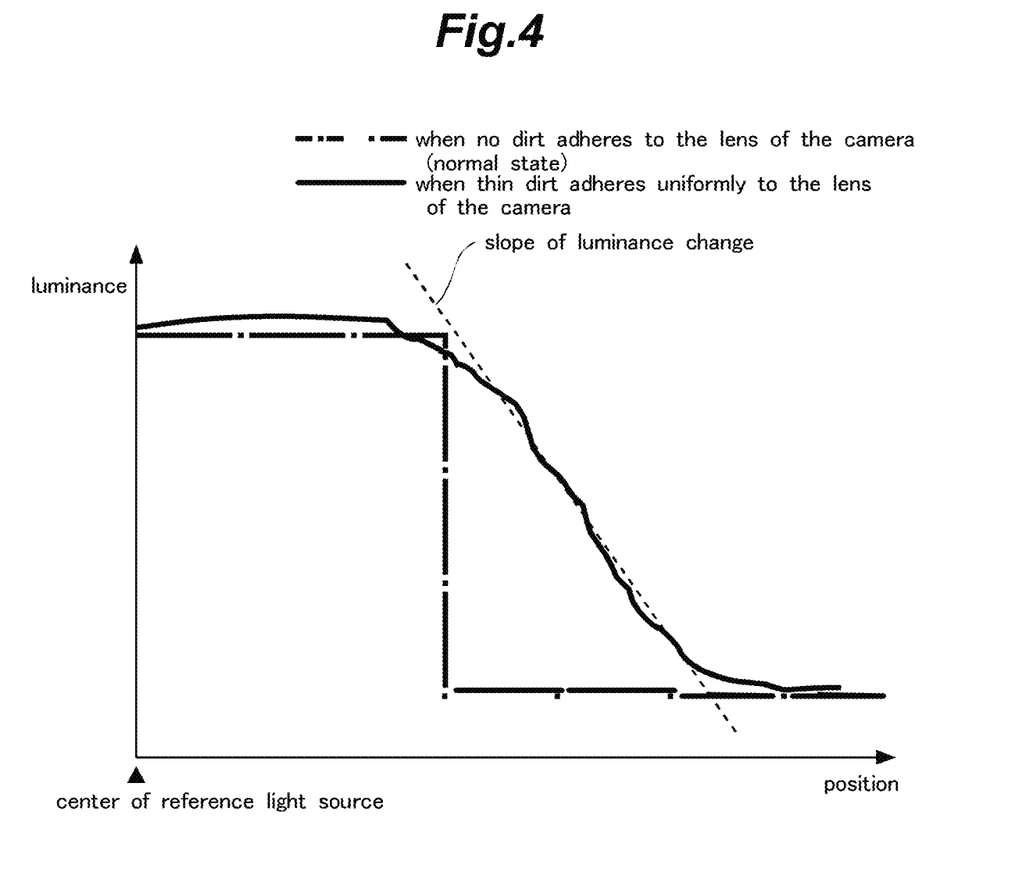
FIG. 4 is a graph representing a luminance change state in the captured image obtained by the first camera.

As shown in FIG. 4, the blur state of the reference light source in the captured image obtained by the first camera 7A can be recognized as a luminance change state around the reference light source. In this graph, the vertical axis represents the luminance, while the horizontal axis represents the position on the captured image with respect to the reference light source; specifically, the distance from the center C of the reference light source. Note that the center C of the reference light source may be the center of the region of the reference light source or the position in the region of the reference light source where the luminance is the highest, for example.

Here, in a normal time, namely, when no dirt adheres to the lens of the first camera 7A (see FIG. 3A), the luminance changes (decreases) sharply at a certain position from the center of the reference light source as the distance of the position from the center of the reference light source increases. On the other hand, when a thin dirt adheres uniformly to the lens of the first camera 7A (see FIG. 3B), the luminance changes (decreases) gradually as the distance from the center of the reference light source increases. In this case, the slope of the luminance change is small.

Thus, in the present embodiment, the dirt on the lens of the first camera 7A is detected based on the luminance change state (specifically, the slope of the luminance change) around the reference light source in the captured image obtained by the first camera 7A.

Note that the degree of dirt adhering to the lens of the first camera 7A is proportional to the degree of blur around the reference light source in the captured image. Namely, as the degree of dirt adhering to the lens of the first camera 7A becomes higher, the degree of blur around the reference light source in the captured image also becomes higher, that is, the slope of the luminance change becomes smaller. Thus, an evaluation value corresponding to the slope of the luminance change may be calculated, and when the evaluation value is outside a predetermined reference range, it may be determined that the dirt adhering to the lens of the first camera 7A has exceeded a tolerable limit. Also, in this case, output of an alert related to the dirt on the lens of the first camera 7A (for example, lighting of a warning lamp) may be performed to notify the driver of the dirt on the lens of the first camera 7A.

Figure 5:
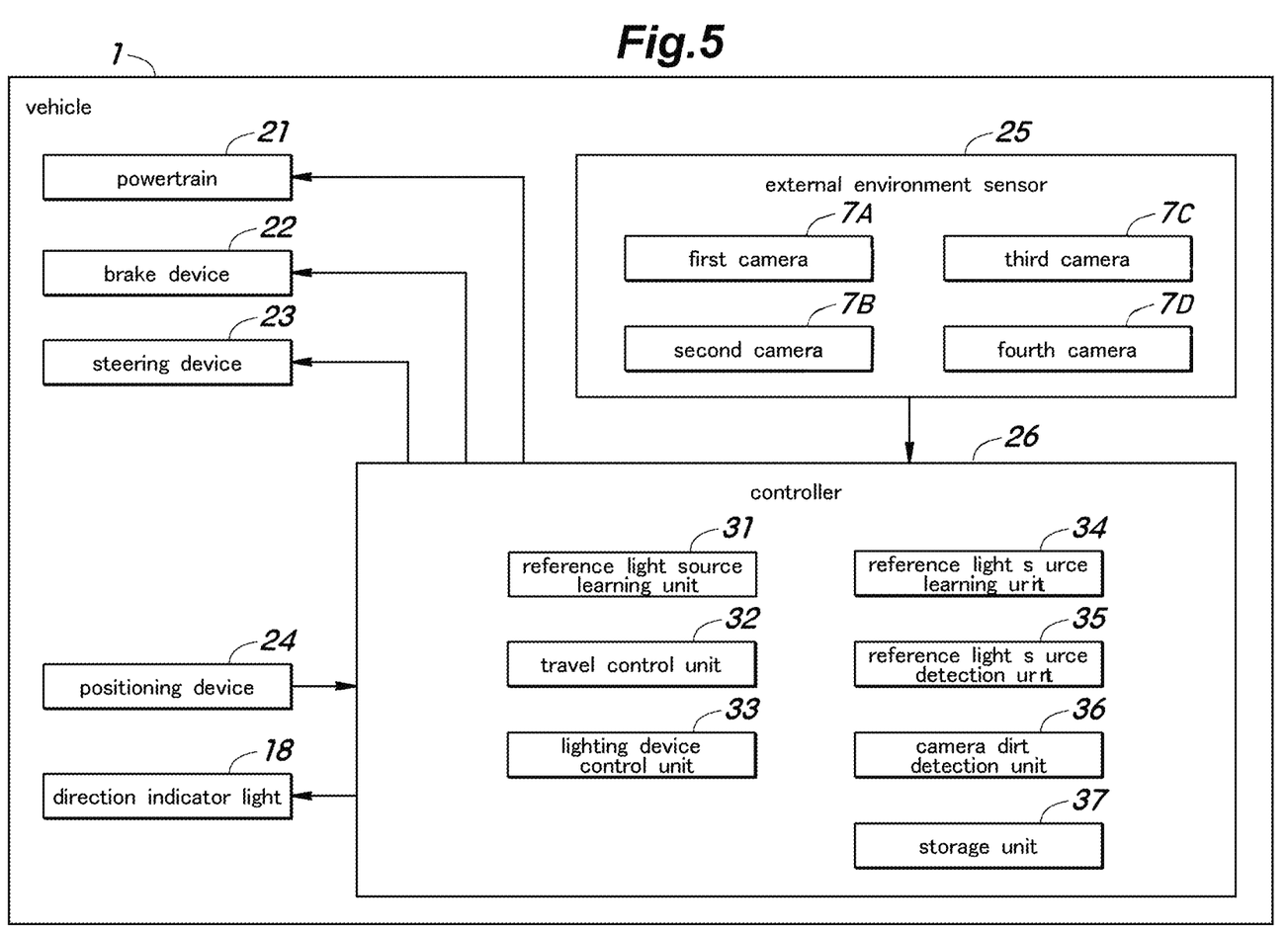
FIG. 5 is a block diagram showing a schematic configuration of the vehicle.

As shown in FIG. 5, the vehicle 1 is provided with a powertrain 21, a brake device 22, a steering device 23, a positioning device 24, an external environment sensor 25, and a controller 26.

The powertrain 21 is a device for applying a driving force to the vehicle 1. For example, the powertrain 21 includes an internal combustion engine, such as a gasoline engine or a diesel engine, and/or an electric motor.

The brake device 22 is a device for applying a braking force to the vehicle 1. For example, the brake device 22 includes a brake caliper for pressing a pad against a brake rotor and an electric cylinder for supplying a hydraulic pressure to the brake caliper.

The steering device 23 is a device for changing the steering angle of the wheels. For example, the steering device 23 includes a rack-and-pinion mechanism for steering the wheels and an electric motor for driving the rack-and-pinion mechanism.

The positioning device 24 outputs a signal (position information) representing the current position of the vehicle 1 by using a satellite positioning system such as the global navigation satellite system (GNSS).

The external environment sensor 25 includes the first cameras 7A (rear side cameras), the second camera 7B (front camera), the third cameras 7C (door cameras), and the fourth camera 7D (rear camera) which are mentioned above. The first to fourth cameras 7A to 7D are used to detect objects present in the vehicle exterior space (for example, obstacles and delimiting lines on the traveling path of the vehicle 1) during travel of the vehicle 1. Also, the first cameras 7A can capture images of passengers getting in/out of the vehicle 1.

The controller 26 is an electronic control unit composed of a processor, a memory, etc. The controller 26 is connected to the various components of the vehicle 1 via a communication network, such as a controller area network (CAN), and controls the various components of the vehicle 1. The controller 26 includes, as the functional units thereof, an external environment recognizing unit 31, a travel control unit 32, a lighting device control unit 33, a reference light source learning unit 34, a reference light source detection unit 35, a camera dirt detection unit 36, and a storage unit 37. These units of the controller 26 may be realized by hardware or may be realized by a combination of software and hardware.

The external environment recognizing unit 31 of the controller 26 recognizes the positions of objects present in the vehicle exterior space (for example, obstacles and delimiting lines on the traveling path of the vehicle 1) based on the detection result of the external environment sensor 25. For example, the external environment recognizing unit 31 recognizes the positions of the objects present in front of the vehicle 1 by analyzing the change in the density value on the image captured by the second camera 7B (front camera).

The travel control unit 32 of the controller 26 performs travel control (driving assistance) of the vehicle 1 based on the result of recognition by the external environment recognizing unit 31, the detection result of the vehicle sensor (not shown in the drawings), etc. The travel control includes various travel controls for configuring an advanced driver assistance system (ADAS) (travel control corresponding to autonomous driving level 1-2 as defined by the SAE). In another embodiment, the travel control performed by the travel control unit 32 may include various travel controls for realizing autonomous driving (AD) (travel control corresponding to autonomous driving level 3 or higher as defined by the SAE).

The lighting device control unit 33 of the controller 26 controls the lighting devices, such as the direction indicator light 18, provided on the vehicle 1 according to the driver's operation and the instruction from the travel control unit 32.

The reference light source learning unit 34 of the controller 26 performs image processing on the captured image obtained by the first camera 7A to search for a light source appropriate as the reference light source from the captured image, and when a light source appropriate as the reference light source is found, sets the light source as the reference light source, whereby the position information of the reference light source is registered in learned light source information. The learned light source information is held in the storage unit 37. Note that the position information of the reference light source includes the positions of places where the reference light source is usable, namely, places where a captured image including the reference light source can be acquired, and the position of the reference light source on the captured image.

For example, if a light source appropriate as the reference light source (for example, a building window) is found from the captured image obtained by the first camera 7A when the vehicle 1 is parked in the regularly used parking space, the light source is set as the reference light source at the parking space. Also, if a light source appropriate as the reference light source (for example, a traffic light or a street light) is found from the captured image obtained by the first camera 7A when the vehicle 1 is traveling on a road, the light source is set as the reference light source related to the road.

Note that the light source appropriate as the reference light source is a light source that satisfies a predetermined condition required of the reference light source. For example, the condition required of the reference light source is that in a normal time, namely, when no dirt adheres to the lens of the first camera 7A, no blur occurs around the reference light source appearing in the captured image obtained by the first camera 7A; specifically, the slope of the luminance change around the reference light source is large.

The reference light source detection unit 35 of the controller 26 performs image processing on the captured image obtained by the first camera 7A and thereby detects the reference light source serving as a reference in the camera dirt detection from the captured image. In the present embodiment, when the vehicle 1 is parked in the regularly used parking space, the reference light source in the case of the regularly used parking space is detected, based on the learned light source information, from the captured image obtained by the first camera 7A. Also, the direction indicator light 18 of the vehicle 1 is detected as the reference light source from the captured image obtained by the first camera 7A. Also, when the vehicle 1 is traveling, based on the learned light source information, a traffic light or a street light is detected as the reference light source from the captured image obtained by the first camera 7A.

Note that in the search for a light source appropriate as the reference light source performed by the reference light source learning unit 34 and the detection of the reference light source performed by the reference light source detection unit 35, object recognition may be performed on the captured image. For example, a traffic light may be recognized from the captured image by object recognition based on the features of the traffic light that is provided with lights of respective colors. Also, in the search for a light source appropriate as the reference light source, three-dimensional map information for use in the travel control may be used.

The camera dirt detection unit 36 of the controller 26 detects the dirt on the lens of the first camera 7A based on the blur state of the reference light source appearing in the captured image obtained by the first camera 7A. In the present embodiment, the dirt on the lens of the first camera 7A is detected based on the luminance change state (specifically, the slope of the luminance change) around the reference light source in the captured image obtained by the first camera 7A.

Note that in another embodiment, an image state (blur state) around the reference light source in the captured image in a normal time, namely, when no dirt adheres to the lens of the first camera 7A, is registered, and the dirt on the lens of the first camera 7A may be detected by comparing the image state around the reference light source in the current captured image with the image state in the normal time.

The storage unit 37 of the controller 26 is composed of a memory, a hard disk drive (HDD), and the like. The storage unit 37 stores programs, tables, etc. necessary for control of the vehicle 1. The information stored in the storage unit 37 includes, for example, dynamic map data used in the travel control of the vehicle 1. The dynamic map data includes static information, quasi-static information, quasi-dynamic information, and dynamic information. The static information includes three-dimensional map information in which the positions of the installations, such as the lanes, traffic lights, etc., are registered.

Figure 6:
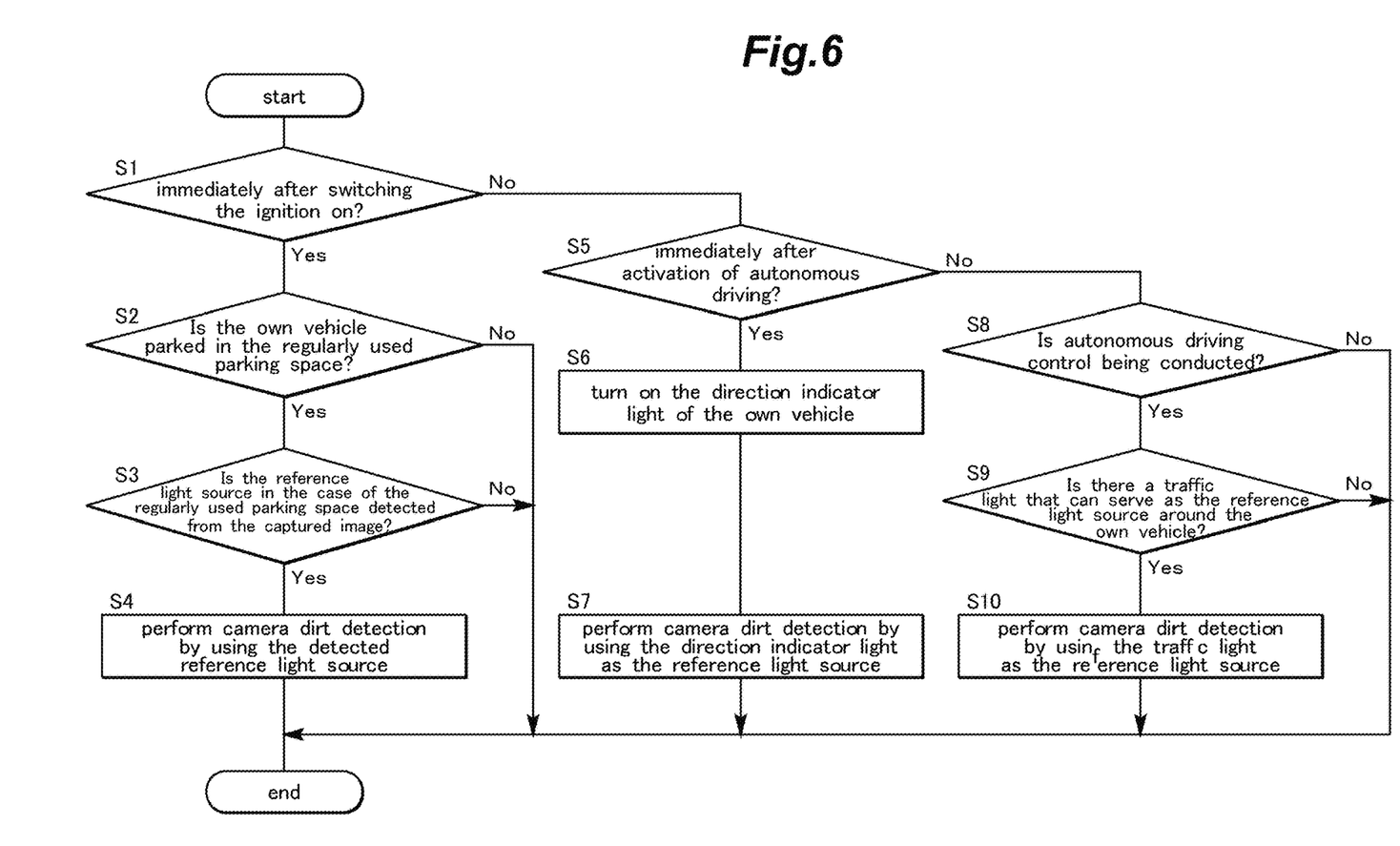
FIG. 6 is a flowchart showing a procedure of a process performed by a controller.

As shown in FIG. 6, before performing the camera dirt detection, the controller 26 determines whether the camera dirt detection may be performed based on the state of the vehicle 1 (own vehicle). Thereby, the camera dirt detection can be performed properly by using an optimal reference light source matching the state of the vehicle 1. Note that this flow is executed regularly.

The controller 26 first determines whether it is immediately after switching the ignition on (the driver's operation of turning on the ignition switch) (step S1). Here, when it is determined that it is immediately after switching the ignition on (step S1: Yes), the controller 26 determines whether the vehicle 1 is parked in the regularly used parking space (step S2). At this time, based on the position information of the current position of the vehicle 1 acquired by the positioning device 24 and the position information of the regularly used parking space included in the learned light source information, it is determined whether the current position of the vehicle 1 matches the position of the regularly used parking space. Note that the regularly used parking space is a parking space used when the driver is at home, for example.

Here, when it is determined that the vehicle 1 is parked in the regularly used parking space (step S2: Yes), the controller 26 determines, based on the learned light source information, whether the reference light source in the case of the regularly used parking space is detected from the captured image obtained by the first camera 7A (step S3). Note that, of the light sources present around the regularly used parking space, a light source satisfying the condition of the reference light source is set as the reference light source in advance.

Here, when it is determined that the reference light source in the case of the regularly used parking space is detected from the captured image obtained by the first camera 7A (step S3: Yes), the controller 26 performs the camera dirt detection by using the detected reference light source (step S4). At this time, the dirt on the lens of the first camera 7A is detected based on the blur state of the reference light source appearing in the captured image obtained by the first camera 7A.

On the other hand, when it is determined that the vehicle 1 is not parked in the regularly used parking space (step S2: No) or it is determined that the reference light source in the case of the regularly used parking space is not detected from the captured image obtained by the first camera 7A (step S3: No), the flow ends and the camera dirt detection is not performed.

Also, when it is determined that it is not immediately after switching the ignition on (step S1: No), the controller 26 determines whether it is immediately after activation of the autonomous driving (step S5). Here, when it is determined that it is immediately after activation of the autonomous driving (step S5: Yes), the controller 26 turns on the direction indicator light 18 of the vehicle 1 (step S6). Subsequently, the controller 26 performs the camera dirt detection by using the direction indicator light 18 as the reference light source (step S7). At this time, the dirt on the lens of the first camera 7A is detected based on the blur state of the direction indicator light 18 appearing in the captured image obtained by the first camera 7A.

Note that the turn-on of the direction indicator light 18 of the vehicle 1 is performed when the vehicle 1 is stopped. In the case where the vehicle 1 is traveling, the camera dirt detection may be performed at a timing when the vehicle 1 turns right or left and the direction indicator light 18 is turned on.

On the other hand, when it is determined that it is not immediately after activation of the autonomous driving (step S5: No), the controller 26 determines whether the autonomous driving control is being conducted (has been activated) (step S8). Here, when it is determined that the autonomous driving control is being conducted (step S8: Yes), the controller 26 determines, based on the position information of the current position of the vehicle 1 and the learned light source information, whether there is a traffic light that can serve as the reference light source around the vehicle 1 (step S9).

Here, when it is determined that there is a traffic light that can serve as the reference light source around the vehicle 1 (step S9: Yes), the controller 26 performs the camera dirt detection by using the traffic light as the reference light source (step S10). At this time, the dirt on the lens of the first camera 7A is detected based on the blur state of the traffic light appearing in the captured image obtained by the first camera 7A.

On the other hand, when it is determined that the autonomous driving control is not being conducted (step S8: No) or there is no traffic light that can serve as the reference light source around the vehicle 1 (step S9: No), the flow ends and the camera dirt detection is not performed.

Note that regarding the determination of whether it is immediately after activation of the autonomous driving (step S5) and the determination whether the autonomous driving control is being conducted (step S8) which are performed in the example shown in FIG. 6, the autonomous driving may be travel control (driving assistance) corresponding to the autonomous driving level 1-2 or travel control corresponding to the autonomous driving level 3 or higher, for example.

Also, in the example shown in FIG. 6, when it is determined that the autonomous driving control is being conducted (step S8: Yes), a traffic light present around the vehicle 1 is used as the reference light source, but the light source used as the reference light source when the vehicle 1 is positioned on the road is not limited to traffic light, and a street light may be used as the reference light source, for example.

Figure 7:
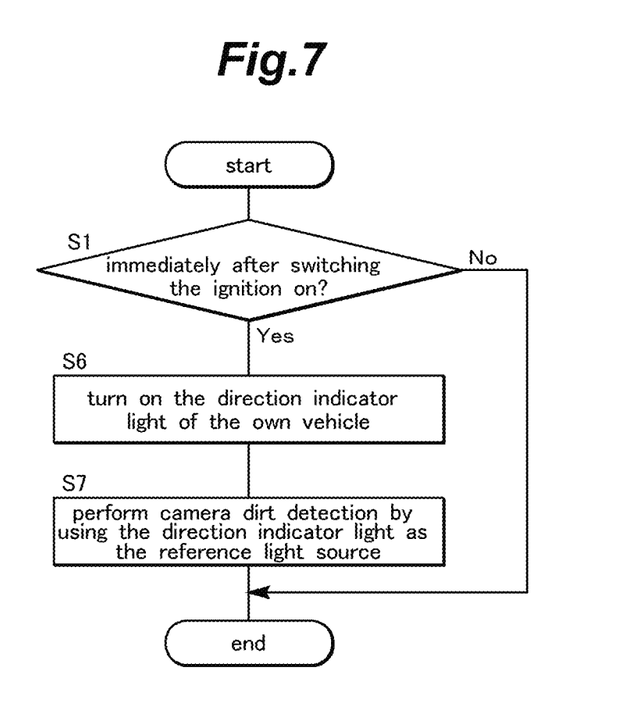
FIG. 7 is a flowchart showing a procedure of a process performed by a controller according to a modification.

Next, a modification of the present embodiment will be described. As shown in FIG. 7, in this modification, the direction indicator light 18 of the vehicle 1 is turned on and the camera dirt detection is performed immediately after switching the ignition on, namely, in the stopped state of the vehicle 1 (own vehicle) before starting.

The controller 26 first determines whether it is immediately after switching the ignition on (step S1). Here, when it is determined that it is immediately after switching the ignition on (step S1: Yes), the controller 26 turns on the direction indicator light 18 of the vehicle 1 (step S6). Subsequently, the controller 26 performs the camera dirt detection by using the direction indicator light 18 as the reference light source (step S7). At this time, the dirt on the lens of the first camera 7A is detected based on the blur state of the direction indicator light 18 appearing in the captured image obtained by the first camera 7A.

On the other hand, when it is determined that it is not immediately after switching the ignition on (step S1: No), the flow ends and the camera dirt detection is not performed.

Concrete embodiments of the present invention have been described in the foregoing, but the present invention is not limited to the above embodiments, and various modifications and alterations are possible.

The invention claimed is:

1. A vehicle, comprising:
   a vehicle body;
   a camera provided on an outer surface of the vehicle body to capture an image of surroundings of the vehicle body; and
   dirt detection system for detecting dirt adhering to a lens of the camera,
   wherein the dirt detection system comprises a controller configured to perform image processing to acquire desired information from the captured image obtained by the camera, and
   the controller is configured
   to detect, from the captured image, a reference light source that serves as a reference in detecting the dirt adhering to the lens of the camera, an image of the reference light source detected from the captured image occupying only a part of the captured image, and
   to detect the dirt adhering to the lens of the camera based on an image state around the reference light source that appears in the captured image.

2. The vehicle according to claim 1, wherein the controller is configured to detect the dirt adhering to the lens of the camera based on, as the image state around the reference light source that appears in the captured image, a state in which a luminance changes from the reference light source to a part around the reference light source in the captured image.

3. A dirt detection system for detecting dirt adhering to a lens of a camera provided on an outer surface of a vehicle body of a vehicle to capture an image of surroundings of the vehicle body,
   wherein the dirt detection system comprises a controller configured to perform image processing to acquire desired information from the captured image obtained by the camera, and
   the controller is configured
   to detect, from the captured image, a reference light source that serves as a reference in detecting the dirt adhering to the lens of the camera, and
   to detect the dirt adhering to the lens of the camera based on an image state around the reference light source that appears in the captured image,
   wherein upon finding a light source satisfying a condition as the reference light source from the captured image, the controller sets the light source as the reference light source, and stores positions of places where the reference light source is usable as learned light source information, and
   when detecting the dirt adhering to the lens of the camera, the controller detects the reference light source corresponding to a current position of the vehicle from the captured image based on the learned light source information and position information of the vehicle.

4. The dirt detection system according to claim 3, wherein the learned light source information includes position information of the reference light source present around a parking space regularly used by the vehicle.

5. A dirt detection system for detecting dirt adhering to a lens of a camera provided on an outer surface of a vehicle body of a vehicle to capture an image of surroundings of the vehicle body,
   wherein the dirt detection system comprises a controller configured to perform image processing to acquire desired information from the captured image obtained by the camera, and
   the controller is configured
   to detect, from the captured image, a reference light source that serves as a reference in detecting the dirt adhering to the lens of the camera, and
   to detect the dirt adhering to the lens of the camera based on an image state around the reference light source that appears in the captured image,
   wherein the controller is configured to detect, as the reference light source, a direction indicator light provided on the vehicle that appears in the captured image.

6. The dirt detection system according to claim 5, wherein the controller is configured to turn on the direction indicator light before the vehicle starts, and to detect the direction indicator light that appears in the captured image as the reference light source.

7. A dirt detection system for detecting dirt adhering to a lens of a camera provided on an outer surface of a vehicle body of a vehicle to capture an image of surroundings of the vehicle body,
   wherein the dirt detection system comprises a controller configured to perform image processing to acquire desired information from the captured image obtained by the camera, and
   the controller is configured to detect, from the captured image, a reference light source that serves as a reference in detecting the dirt adhering to the lens of the camera, and to detect the dirt adhering to the lens of the camera based on an image state around the reference light source that appears in the captured image, wherein the controller is configured to detect a traffic light that appears in the captured image as the reference light source.

8. The dirt detection system according to claim 7, wherein the controller is configured to detect the traffic light that appears in the captured image as the reference light source after the vehicle has started.

\* \* \* \* \*